United States Patent [19]

Thompson et al.

[11] Patent Number: 4,977,936
[45] Date of Patent: Dec. 18, 1990

[54] FILLER NECK SEALING ASSEMBLY

[75] Inventors: Robert H. Thompson, Dearborn Heights, Mich.; Emil Szlaga; Robert S. Harris, both of Connersville, Ind.

[73] Assignee: Stant Inc., Connersville, Ind.

[21] Appl. No.: 400,815

[22] Filed: Aug. 30, 1989

Related U.S. Application Data

[63] Continuation-in-part of Ser. No. 148,384, Jan. 25, 1988, Pat. No. 4,883,103, which is a continuation-in-part of Ser. No. 106,632, Oct. 8, 1987, Pat. No. 4,816,045, which is a continuation-in-part of Ser. No. 846,081, Mar. 31, 1986, Pat. No. 4,770,677.

[51] Int. Cl.$^5$ .................. B67D 5/04; B01D 19/00
[52] U.S. Cl. ........................ 141/312; 141/44; 141/59; 141/286; 141/369; 55/387; 277/152; 277/181; 277/189; 137/587; 220/DIG. 33; 220/85.0 VS; 220/85.0 VR
[58] Field of Search ............ 141/44, 45, 46, 59, 141/286, 312, 311 R, 368, 369, 370, 371, 375, 392; 55/88, 182, 387; 137/587–589; 277/152, 181, 182, 189

[56] References Cited

U.S. PATENT DOCUMENTS

| | | |
|---|---|---|
| 2,174,075 | 9/1939 | Borchardt . |
| 2,282,312 | 5/1942 | Halstead . |
| 2,746,781 | 5/1956 | Jones ................... 277/152 |
| 3,393,917 | 7/1968 | Kendall et al. . |
| 3,478,922 | 11/1969 | Mole .................. 220/86 R |
| 3,543,484 | 12/1970 | Davis . |
| 3,748,829 | 7/1973 | Joyce et al. . |
| 3,911,977 | 10/1975 | Berger . |
| 3,920,250 | 11/1975 | Eklund ............... 277/152 X |
| 3,921,412 | 11/1975 | Heath et al. . |
| 3,964,754 | 6/1976 | Murai et al. . |
| 4,053,166 | 10/1977 | Domkowski ............. 277/152 |
| 4,055,352 | 10/1977 | Allinquant et al. ........ 277/152 |
| 4,142,647 | 3/1979 | Walters . |
| 4,152,265 | 11/1978 | Grzesiak ................ 277/152 |
| 4,159,829 | 7/1979 | Ditcher ................. 277/189 |
| 4,232,715 | 11/1980 | Pyle . |
| 4,298,203 | 11/1981 | Holzer et al. ............ 277/152 |
| 4,323,166 | 4/1982 | Maeroff . |
| 4,424,839 | 1/1984 | Otani et al. . |
| 4,508,355 | 4/1985 | Ditcher ................ 277/189 |
| 4,630,749 | 12/1986 | Armstrong ............. 220/86 R |
| 4,651,889 | 3/1987 | Uranishi et al. ......... 220/85 VR |
| 4,699,638 | 10/1987 | Harris .................. 55/168 |
| 4,701,198 | 10/1987 | Uranishi et al. .......... 55/387 |
| 4,702,386 | 10/1987 | Boehmer et al. ........ 220/86 R |
| 4,707,164 | 11/1987 | Harris . |
| 4,714,172 | 12/1987 | Morris ................ 220/86 R |
| 4,741,369 | 5/1988 | Dawson ................ 141/286 |
| 4,765,504 | 8/1988 | Sherwood et al. ....... 220/86 R |
| 4,770,677 | 9/1988 | Harris .................. 55/168 |
| 4,795,050 | 1/1989 | Smith et al. ............ 220/85 VR |
| 4,809,863 | 3/1989 | Woodcock et al. ........ 220/85 F |
| 4,816,045 | 3/1989 | Szlaga et al. ............ 55/168 |
| 4,836,835 | 6/1989 | Harris et al. ............. 55/168 |
| 4,877,146 | 10/1989 | Harris ................. 220/85 VR |
| 4,883,103 | 11/1989 | Szlaga et al. ............ 141/368 |

FOREIGN PATENT DOCUMENTS

| | | | |
|---|---|---|---|
| 999247 | 11/1976 | Canada ................. 220/86 R |
| 3601349 | 7/1987 | Fed. Rep. of Germany ...... 277/152 |
| 1057629 | 2/1967 | United Kingdom ............. 277/152 |

Primary Examiner—Ernest G. Cusick
Attorney, Agent, or Firm—Barnes & Thornburg

[57] ABSTRACT

A sealing assembly is provided for use in a filler neck sized to receive a fuel-dispensing nozzle. The sealing assembly includes an elastic seal member between the filler neck and a fuel-dispensing nozzle and a seal retainer for clamping the seal member in the filler neck to define in the filler neck an outer chamber communicable with the atmosphere and an inner chamber. The seal is configured to admit the fuel-dispensing nozzle into the inner chamber without coupling the inner and outer chambers in vapor communication. The sealing assembly partitions a fuel-conducting passageway in the filler neck to limit flow of vapors and gases through the passageway during dispensing of fuel into the filler neck and past the sealing assembly.

35 Claims, 3 Drawing Sheets

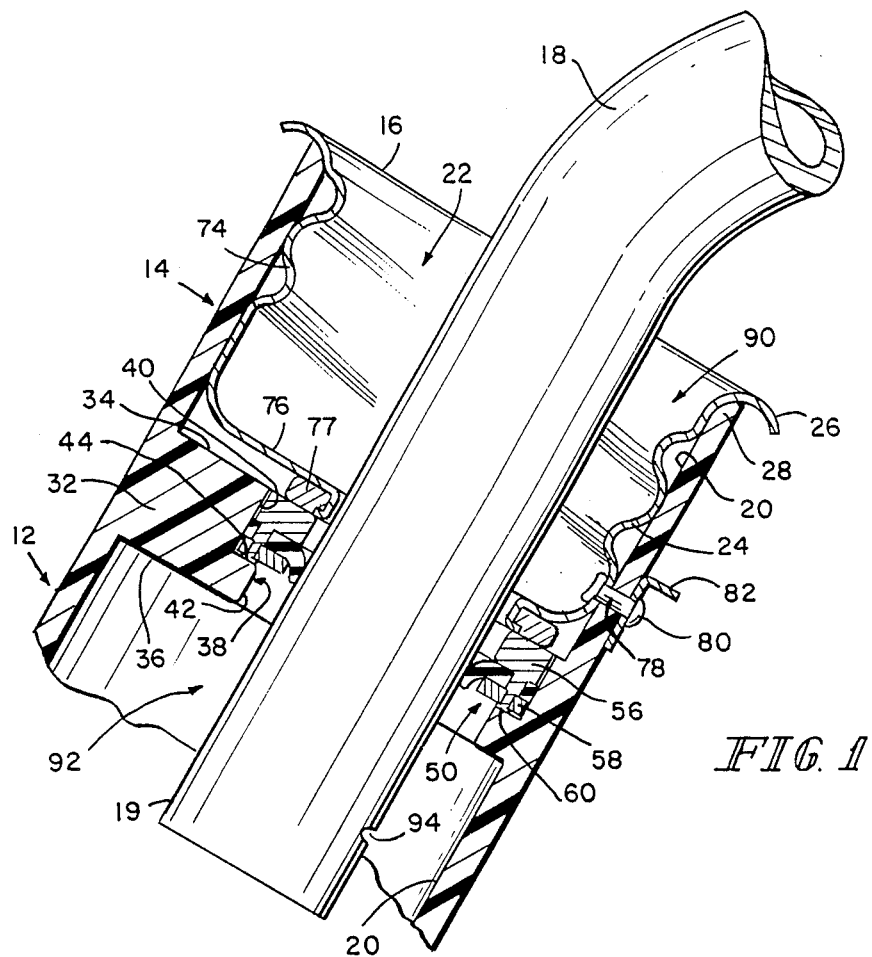
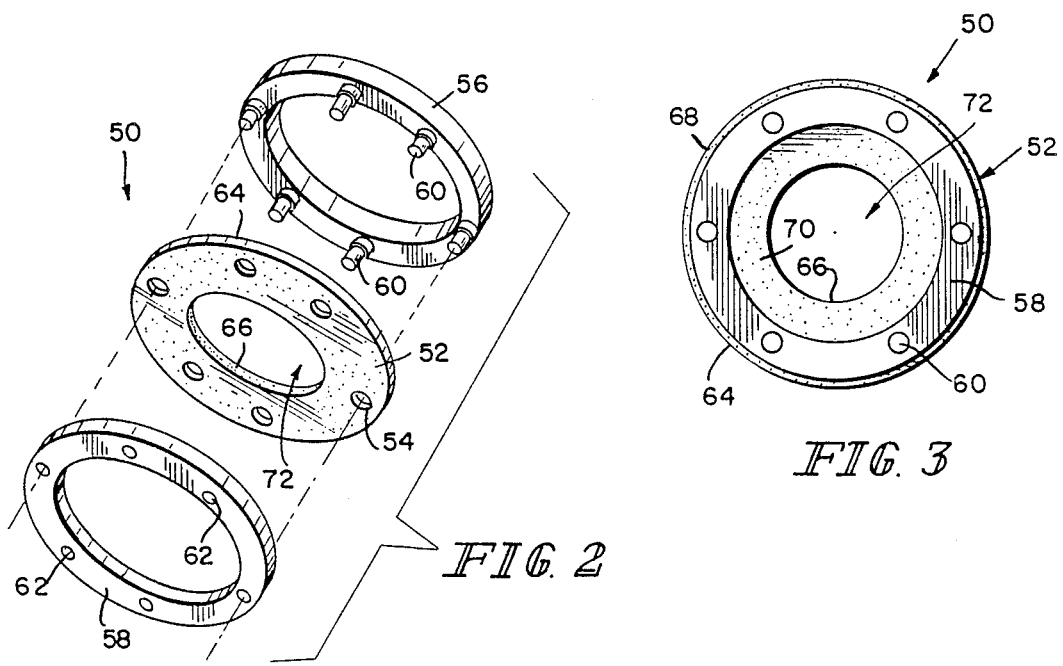

U.S. Patent  Dec. 18, 1990  Sheet 3 of 3  4,977,936
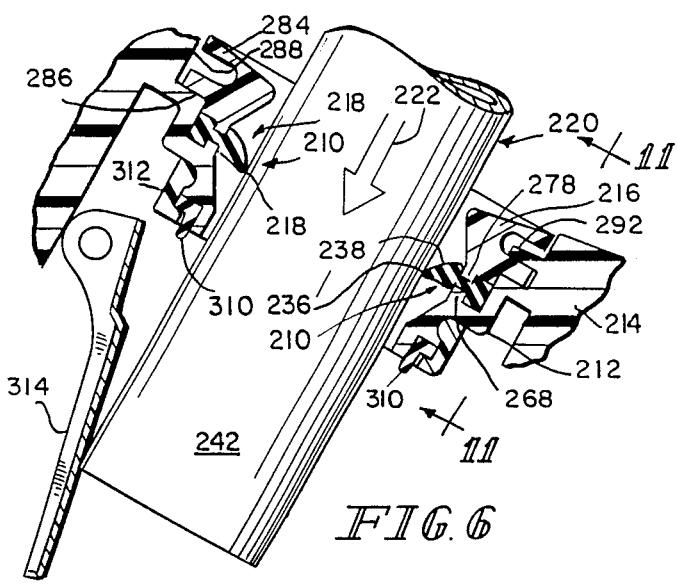
FIG. 6
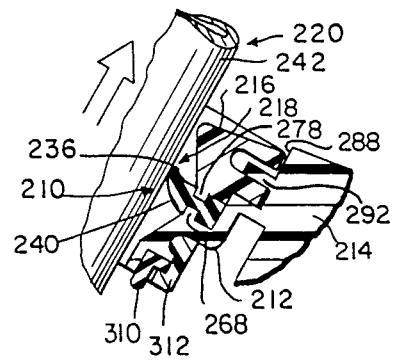
FIG. 7
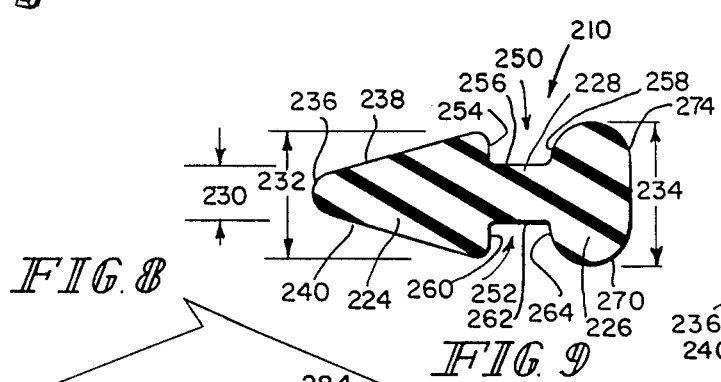
FIG. 8   FIG. 9
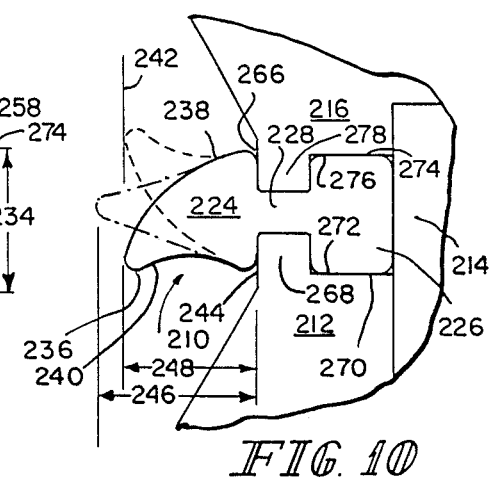
FIG. 10
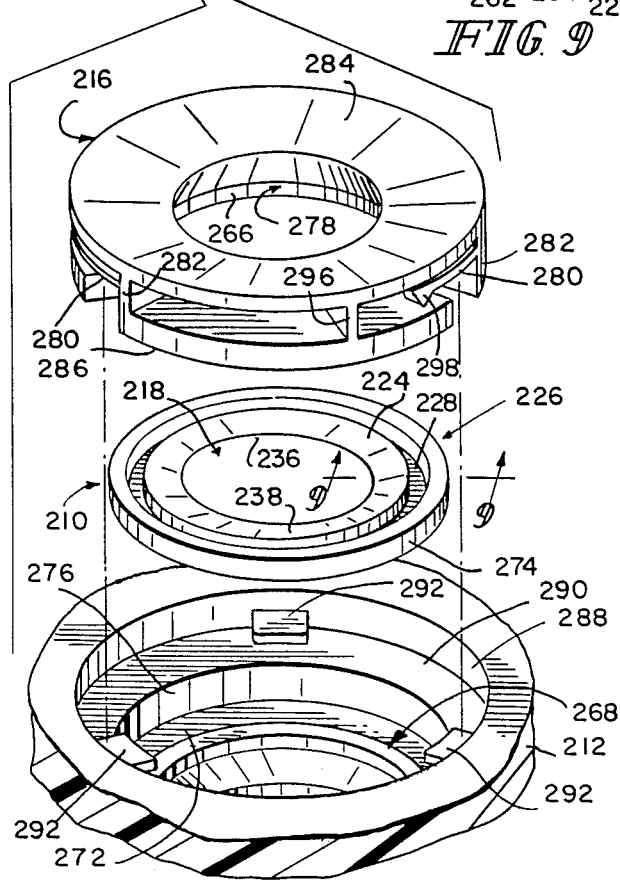
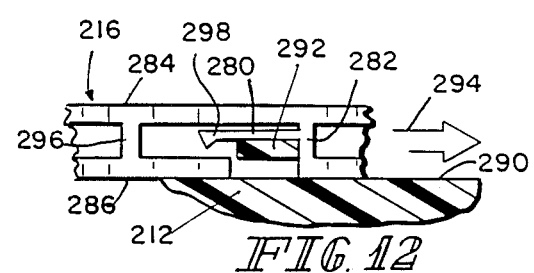
FIG. 12
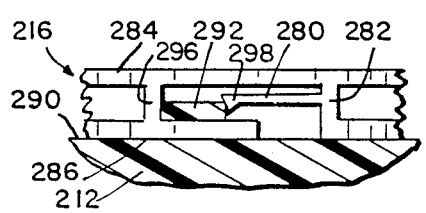
FIG. 11

FILLER NECK SEALING ASSEMBLY

BACKGROUND AND SUMMARY OF THE INVENTION

This is a continuation-in-part of co-pending patent application Ser. No. 07/198,384 filed Jan. 25, 1988, now U.S. Pat. No. 4,883,103, issued Nov. 28, 1989, which is a continuation-in-part of application Ser. No. 106,632, filed Oct. 8, 1987, now U.S. Pat. No. 4,816,045, issued Mar. 28, 1989, which is a continuation-in-part of application Ser. No. 896,081 filed Mar. 31, 1986, now U.S. Pat. No. 4,770,677, issued Sept. 13, 1988.

The present invention relates to a sealing assembly in a filler neck, and particularly to means for establishing a seal between the filler neck and a liquid-dispensing nozzle in the filler neck. More particularly, the present invention relates to a sealing assembly in a vehicle fuel system filler neck for sealingly admitting a fuel-dispensing nozzle into the filler neck without permitting substantial exhaustion of fuel vapors in the filler neck to the atmosphere or admission of atmospheric pressure into the fuel system through the filler neck.

Polluting emissions are released into the atmosphere during each and every motor vehicle refueling activity through the mouth of the filler neck. In view of the frequency of vehicle refueling activities, it will be appreciated that a significant quantity of otherwise combustible fuel is lost to the atmosphere each time a vehicle is refueled.

New fuel vapors are generated during refueling due to splash and agitation of the dispensed fuel, as well as from potential temperature differences between the fuel tank and the dispensed fuel. In addition, as the liquid fuel dispensed at the pump fills the vehicle fuel tank, fuel vapors that are present in the tank and generated during refueling are displaced by liquid fuel. These displaced fuel vapors are moved out of the fuel tank vapor space by the displacing action of the liquid fuel. In conventional vehicle fuel systems, these displaced vapors are released directly into the atmosphere via the fuel tank filler neck and are a contributing factor to air pollution.

Many conventional filler necks and fuel tank assemblies on vehicles are not configured to control this escape of fuel vapor effectively during the refilling process. Generally, the filler neck of a vehicle has a diameter greater than the diameter of the fuel-dispensing nozzle. Because of the relatively large diameter of the filler neck with respect to the fuel-dispensing nozzle, the fuel vapor created by fuel dispensed into the fuel tank through the filler neck escapes out through the filler neck and to the atmosphere substantially continuously during the filling operation. This creation of fuel vapor during the refueling process has recently been recognized as a major contributor to pollution of the atmosphere, especially with newer, more volatile blends of vehicle fuel.

Attempts have been made to control this escape of fuel vapor during the filling process by adapting the service station fuel-dispensing nozzle to include a vapor recovery portion which captures the escaping fuel vapor and prevents the fuel vapor from escaping into the atmosphere. Such conventional methods of capturing the escaping fuel vapor have generally proven unsatisfactory because of the complexity of the system and because of relatively poor vapor-capturing characteristics of the system. It is generally recognized that for satisfactory fuel vapor control during refilling, a system must be provided which is on-board the vehicle for capturing and controlling such fuel vapor generated during refilling. Ideally, such a system would work automatically without any operator supervision.

Another problem with many conventional filler neck and fuel tank assemblies is that it is sometimes extremely difficult to achieve accurate filling levels because of poorly designed filler neck seals which leak, resulting in an inability to maintain any vacuum that might develop in the filler neck itself during introduction of fuel into the filler neck. Conventional fuel nozzles are often equipped with vacuum-actuated systems that shut off flow of fuel through the nozzle upon exposure of a sensor in the nozzle to a predetermined negative pressure. Typically, the splashed back fuel enters and blocks a conduit formed in the nozzle to lie in communication with the sensor to generate the negative pressure, thereby shutting off fuel flow.

Relying upon fuel splash-back provides generally unsatisfactory fill level consistency because such fuel splash back is dependent upon a number of factors. Such factors include the flow rate of the nozzle, the configuration and routing of the filler neck, and the general orientation of the filler neck with the fuel tank, as well as fuel-dispensing nozzle sensitivity. Because of such inconsistency in achieving accurate fill levels, it would be advantageous to provide a nozzle shutoff control system having an improved means for providing a negative pressure signal to a vacuum-actuated shutoff sensor which would ideally permit the fuel tank to be filled to accurate, consistent fill levels during each refueling operation.

One object of the present invention is to provide a sealing assembly for partitioning a fuel-conducting passageway in a filler neck to limit flow of vapors and gases through the passageway during dispensing of fuel into the filler neck and past the sealing assembly.

Another object of the present invention is to provide a sealing assembly for preventing fuel vapor loss to the atmosphere through the filler neck during refueling in cooperation with a fuel vapor recovery system.

Yet another object of the present invention is to provide a sealing assembly for blocking communication of an inner chamber of the filler neck with the atmosphere during refueling to maintain a negative pressure condition in the inner chamber in cooperation with a vapor-handling system to enhance operation of a vacuum-actuated nozzle shutoff system communicating with the inner chamber.

Another object of the present invention is to provide a filler neck sealing assembly having an elastic seal configured to maintain unbroken sealing engagement with the nozzle during insertion of the nozzle into and withdrawal of the nozzle from the filler neck, even though the nozzle may have been deformed to assume an out-of-round shape.

Yet another object of the present invention is to provide a filler neck sealing assembly having an elastic seal that is configured to be stretched or distended easily to conform to the contours of an out-of-round fuel-dispensing nozzle.

According to the present invention, a filler neck seal assembly is provided for use in a filler neck sized to receive a fuel-dispensing nozzle. The seal assembly includes an elastic seal member and a seal retainer. The seal member has an annular fuel nozzle-sealing portion and an annular filler neck-mounting portion which surrounds the annular fuel nozzle-sealing portion. The seal retainer includes means for engaging a filler neck containing the seal member and means for unyieldingly clamping the annular filler neck mounting portion of the seal member to the filler neck to establish a fixed circumferentially extending liquid fuel and fuel vapor seal between the seal member and the filler neck. The filler neck-mounting portion of the seal member is clamped to cantilever the annular fuel nozzle-sealing portion in the filler neck for movement relative to the clamped filler neck-mounting portion in response to engagement with a fuel nozzle during movement of the fuel nozzle in the filler neck.

In preferred embodiments, the annular fuel nozzle-sealing portion includes an annular, radially inwardly facing, perimeter end wall defining a nozzle-receiving aperture and inclined annular outer and inner sealing faces. The outer sealing face is presented in an axially outwardly direction toward the filler neck mouth to engage the nozzle in sealing relation during insertion of the nozzle into the nozzle-receiving aperture. The inner sealing face is presented in an axially inwardly facing direction away from the filler neck mouth to engage the nozzle in sealing relation during withdrawal of the nozzle from the nozzle-receiving aperture. The outer and inner sealing faces are interconnected by the annular, radially inwardly facing, perimeter end wall and diverge in a radially outwardly extending direction away from the perimeter end wall and toward the filler neck-mounting portion.

The elastic annular seal member is formed to include an axially outwardly facing first annular groove and an axially extending second annular groove between the fuel nozzle-sealing and filler neck-mounting portions. A radially extending, axially outwardly facing surface defines a bottom wall of the first annular groove and a radially extending, axially inwardly facing surface defines a bottom wall of the second annular groove. The filler neck includes positioning means extending into the second annular groove formed in the seal member for positioning the filler neck-mounting portion in sealing engagement with the filler neck.

The seal retainer includes retaining means extending into the first annular groove formed in the seal member for retaining the filler neck-mounting portion in sealing engagement with the filler neck to establish fixed circumferentially extending liquid fuel and fuel vapor seal between the seal member and the filler neck. The seal retainer includes means for rotatably engaging the filler neck to place the retaining means in the first annular groove formed in the seal member.

One feature of the present invention is the provision in a filler neck of seal-establishing means for admitting a fuel-dispensing nozzle into an inner chamber in the filler neck without coupling the inner chamber to the atmosphere through the filler neck mouth. One advantage of such a sealing system is that it helps to prevent fuel vapor loss through the filler neck during operation of an on-board vehicle fuel vapor recovery system by blocking flow of pressurized fuel vapor in the filler neck to the atmosphere during refueling. Another advantage of this sealing system is that it cooperates with a vapor-handling system in a vehicle fuel system to maintain any negative pressure condition that develops in the inner chamber during refueling to enhance the operation of a vacuum-actuated nozzle shutoff system having its shutoff sensor communicating with the inner chamber.

Another feature of the present invention is that the seal member includes a radially outer portion that is securely clamped in place in the filler neck to establish a fixed circumferentially extending liquid fuel and fuel vapor seal in the filler neck between the seal member and the filler neck. Advantageously, such a fixed seal is less likely to be broken as a result of wear and tear on the seal member caused by repeated insertion and removal of the fuel-dispensing nozzle during refueling.

Still another feature of the present invention is that the seal member includes a radially inner portion that is configured to stretch and move relative to the clamped radially outer portion when engaged by the fuel-dispensing nozzle so that the seal member is stretched or distended to conform to the contour of a conventional or out-of-round nozzle during insertion of the nozzle into the filler neck and withdrawal of the nozzle from the filler neck. In a preferred embodiment, the seal member includes a thin annular web that is configured to interconnect the relatively thicker unclamped nozzle-sealing portion and clamped seal-mounting portions of the seal member. Provision of a thinner annular web allows the movable nozzle-sealing portion to stretch more easily to follow a regular or irregular contour of the fuel-dispensing nozzle as it is moved within the filler neck during refueling.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a longitudinal sectional view of a preferred embodiment of the present invention showing a fuel-dispensing nozzle inserted into a filler neck during refueling;

FIG. 2 is an exploded view of the embodiment of FIG. 1 illustrating the assembly of a pair of mounting rings onto a sealing ring;

FIG. 3 is an elevation view of the rings shown in FIG. 2 following assembly;

FIG. 6 is a longitudinal sectional view of yet another embodiment of the present invention showing axially inward deflection of an elastic annular seal as a fuel-dispensing nozzle is inserted into a fuel filler neck and sealed by the elastic annular seal during refueling;

FIG. 7 is a view of the embodiment in FIG. 6 showing axially outward deflection of the elastic annular seal during withdrawal of the nozzle from the filler neck;

FIG. 8 is an exploded view of the embodiment of FIG. 6 illustrating the assembly of a retainer member over the elastic annular seal to trap the annular seal in its mounted position in a recessed cavity formed in the fuel filler neck;

FIG. 9 is a transverse cross-sectional view of the annular seal taken along lines 9—9 of FIG. 8 showing the arrow-like cross-sectional shape of the annular seal;

FIG. 10 is a diagrammatic view based on FIGS. 6 and 7 showing deflection of an annular head portion of the elastic annular seal relative to a clamped annular base portion thereof during axial movement of a fuel-dispensing nozzle received in the elastic annular seal;

FIG. 11 is a dead sectional view taken along lines 11—11 of FIG. 6 showing the retainer member in its locked position connected to the fuel filler neck; and FIG. 12 is a sectional view similar to FIG. 11 showing the retainer member before it has been rotated relative to the fuel filler neck to a locked position to trap the annular seal in a secure position within the fuel filler neck.

DETAILED DESCRIPTION OF THE DRAWINGS

Figure 4:
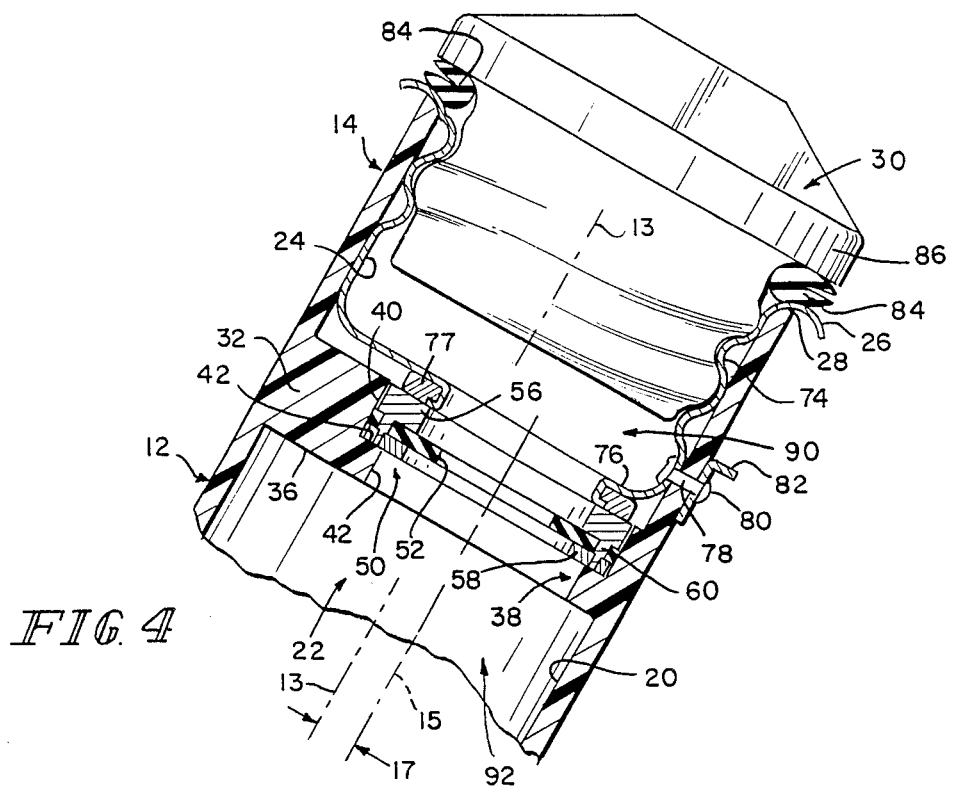
FIG. 4 is a longitudinal sectional view similar to the view in FIG. 1 showing a fuel cap mounted on a filler neck in a fully tightened position during normal non-refueling activities.

The sealing assembly of the present invention advantageously admits a fluid-dispensing nozzle into a filler neck without allowing pressurized vapors in the filler neck generated during refueling to escape to the atmosphere and without allowing dissipation of any vacuum that may be created in the filler neck during a filling operation. In preferred embodiments, the sealing assembly is positioned in the filler neck of a vehicle fuel system having a fuel tank in communication with the filler neck. In such an environment, the sealing assembly effectively forms a barrier interconnecting the filler neck and a fuel-dispensing nozzle in the filler neck to limit flow of fuel vapor and atmosphere into and out of the filler neck during refueling.

A fuel tank filler neck 12 having a distal end 14 formed to include a mouth 16 for receiving a fuel-dispensing nozzle 18 is shown in FIG. 1. Filler neck 12 includes an inner wall 20 defining a nozzle-receiving passageway 22. Threaded insert 24 is dropped into passageway 22 so that its peripheral flange 26 rests on the annular lip 28 of mouth 16. Insert 24 provides means for threadedly receiving a fuel cap 30 to close the mouth 16 of the filler neck 12 as shown in FIG. 4.

Annular partition 32 is unitarily formed with filler neck 12 and situated in passageway 22 to extend in a radially inward direction from its roots along inner wall 20. Partition 32 is formed to include outer face 34, inner face 36, and a stepped annular side wall 38 interconnecting faces 34 and 36. Annular side wall 38 defines first and second axially extending, radially inwardly facing, annular surfaces 40, 42 and a radially inwardly extending, outwardly facing, annular surface 44. Surfaces 40 and 44 are orthogonal and cooperate to define an annular ring-receiving groove.

A ring assembly 50 is installable in the annular groove formed by surfaces 40 and 44 to form a sealed vapor flow barrier between partition 32 and nozzle 18 upon insertion of nozzle 18 into its fuel-dispensing position in passageway 22. Ring assembly 50 includes a sealing ring 52 having a plurality of circumferentially spaced, rivet-receiving holes 54 and a pair of mounting rings 56, 58. The rings 52, 56, 58 are concentrically aligned prior to assembly as shown in FIG. 2 so that rivets 60 on mounting ring 56 will pass through holes 54 in sealing ring 52 to be received in companion holes 62 formed in mounting ring 58. In this way, the sealing ring 52 is securely trapped between the two mounting rings 56, 58 to provide ring assembly 50.

As shown best in FIG. 4, the filler neck 12 has a longitudinal central axis 13 extending through the nozzle-receiving passageway 22. The partition 32 is formed to include an aperture defined by annular surface 40 for receiving the ring assembly 50. The passage has a central axis 15 offset in substantially spaced-apart parallel relation to the longitudinal central axis of the filler neck by dimension 17 so that the aperture is aligned in offset relation to the inner wall 20 of the filler neck 12. The sealing ring 52 has its center in coaxial relation with the central axis 15 of the aperture so that the sealing ring 52 is aligned in offset relation to the inner wall 20 of the filler neck 12.

Referring to FIG. 3, it will be seen that the outer diameter of sealing ring 52 defined by outer edge 64 is greater than the outer diameter of either of mounting rings 56, 58. Also, the inner diameter of sealing ring 52 defined by inner edge 66 is less than the inner diameter of either of mounting rings 56, 58. Upon interconnection of rings 56, 58 using rivets 60 to trap the sealing ring 52 therebetween, the outer boundary edges of mounting rings 56, 58 cooperate to define an outer annular sealing portion 68 and the inner boundary edges of mounting rings 56, 58 cooperate to define an inner annular sealing portion 70.

Upon assembly of ring assembly 50 into the ring-receiving groove defined by surfaces 40 and 44 as shown in FIG. 1, the outer annular sealing portion 68 will deflect somewhat relative to the rigid, interconnected mounting rings 56, 58 to establish sealing engagement with first sealing surface 40. Such deflection occurs uniformly around the circumference of sealing ring 52 since the outer diameter of sealing ring 52 defined by outer edge 64 is slightly greater than the inner diameter of the aperture defined by annular surface 40. Mounting rings 56, 58 can be attached to filler neck 12 in the position illustrated in FIG. 1 using any suitable means to retain the outer annular sealing portion 68 in sealing engagement with surface 40 to prevent flow of liquid fuel, fuel vapors, or atmosphere between sealing ring 52 and surface 40 of filler neck 12.

Inner edge 66 of sealing ring 52 defines a central aperture 72 sized to receive a fluid-dispensing nozzle 18 therethrough. As shown in FIG. 1, the inner diameter of sealing ring 52 defined by inner edge 66 is slightly less than the outer diameter or dimension of nozzle 18 so that the inner annular sealing portion 70 will deflect somewhat relative to the rigid, interconnected mounting rings 56, 58 upon insertion of nozzle 18 into the central aperture 72 of sealing ring 52.

Sealing ring 52 is made of a resilient sealing material such as flurosilicone so that it will sealingly engage a sealing surface 19 provided by the outer circumference of nozzle 18 to establish a circumferentially extending fuel vapor and atmosphere barrier between partition 32 and nozzle 18. Advantageously, central aperture 72 can be configured to receive a wide variety of nozzle sizes (i.e., diameters, cross-sectional shapes, and configurations) due to the resilient, expandable character of the sealing material from which ring 52 is desirably made.

The threaded insert 24 mounted in the distal end 14 of filler neck 12 is desirably provided by a metal cup having a thread-shaped side wall 74 engaging inner wall 20 and a bottom wall 76 coupled to a support ring 77 situated to abut mounting ring 56 and hold the ring assembly 50 in a predetermined position. Metal rivet means 78 or the like is used to attach threaded insert 24 to the filler neck 12. Desirably, a head portion 80 of rivet means 78 is exposed on the exterior of filler neck 12 or otherwise positioned to communicate directly with metal grounding strap 82. Thus, insert 24, rivet means 78, and grounding strap 82 cooperate to provide static eliminator means extending through a wall of the filler neck 12 to ground the system.

The relationship between ring assembly 50 and fuel cap 30 is illustrated in FIG. 4. Sealing ring 52 is situated in passageway 22 in spaced relation to a conventional closure gasket 84 trapped between peripheral flange 26 and an outer portion 86 of fuel cap 30. Typically, gasket 84 is carried by fuel cap 30. Thus, the seal-establishing means provided by sealing ring 52 or the like is exposed upon removal of fuel cap 30 and gasket 84 from the filler neck 12. This exposure permits an operator to establish a sealed barrier in the filler neck passageway 22 in spaced relation to the filler neck mouth 16 by inserting a fuel-dispensing nozzle (e.g., 18) a distance into passageway 22 sufficient to cause the circumference of the exterior surface 19 of nozzle 18 to be sealingly embraced by the inner annular sealing portion 70 of sealing ring 52.

The partition 32 and ring assembly 50 cooperate to divide passageway 22 into an outer chamber 90 communicable with the atmosphere through the filler neck mouth 16 and an inner chamber 92 in fluid communication with a fuel tank (not shown) or other portion of a vehicle fuel system or the like. As shown in FIG. 1, sealing ring 52 is configured and positioned to admit a fuel-dispensing nozzle 18 into inner chamber 92 through central aperture 72 without coupling inner and outer chambers 92, 90 in fluid communication. In other words, upon such nozzle insertion, liquid fuel and pressurized fuel vapor in inner chamber 92 is prevented from escaping to the atmosphere through mouth 16 and atmosphere extant in outer chamber 90 is blocked from admission into inner chamber 92.

One advantage produced by inclusion of ring assembly 50 in filler neck passageway 22 is that fuel vapor in inner chamber 92 and the rest of the fuel system connected to inner chamber 92 is unable to be exhausted to the atmosphere through filler neck mouth 16 during refueling. This vapor retention feature is particularly advantageous when used in combination with an on-board vapor recovery system of the type disclosed in U.S. Pat. Nos. 4,770,677 and 4,816,045, which are hereby incorporated by reference. Fuel vapor in inner chamber 92 can be conveniently conducted to an onboard fuel vapor treatment site such as a canister rather than discharged through the filler neck mouth 16 to the atmosphere due to the vapor seal established by partition 32 and sealing ring 52.

Another advantage of the present invention is that provision of a passageway sealing system in the filler neck 12 enhances operation of a vacuum-actuated shut-off system provided in a fuel-dispensing nozzle configured to be inserted into filler neck passageway 22. Referring to FIG. 1, nozzle 18 is formed to include an aperture 94 near its distal end. Typically, such nozzles are equipped with a vacuum-actuated system (not shown) that functions to shut off flow of fuel through the nozzle in response to exposure of aperture 94 to negative pressure in excess of a predetermined magnitude. Reference is hereby made to U.S. Pat. No. 4,816,045 for a description of a vapor-handling system which functions to provide such a shutoff negative pressure to a filler neck chamber such as inner chamber 92 upon sensing the quantity of fuel in the fuel system to actuate a nozzle-based, vacuum-actuated, shutoff system coupled to aperture 94.

Advantageously, the prevent invention provides seal-establishing means 32, 50 for preventing dissipation of any negative pressure that may be created in inner chamber 92 during a fuel-dispensing operation involving insertion of nozzle 18 into filler neck passageway 22. Thus, a vacuum applied to aperture 94 by a vapor-handling system of the type described above is not dissipated during refueling by admission into the inner chamber 92 of atmosphere present in outer chamber 90 due to removal of fuel cap 30.

Figure 5:
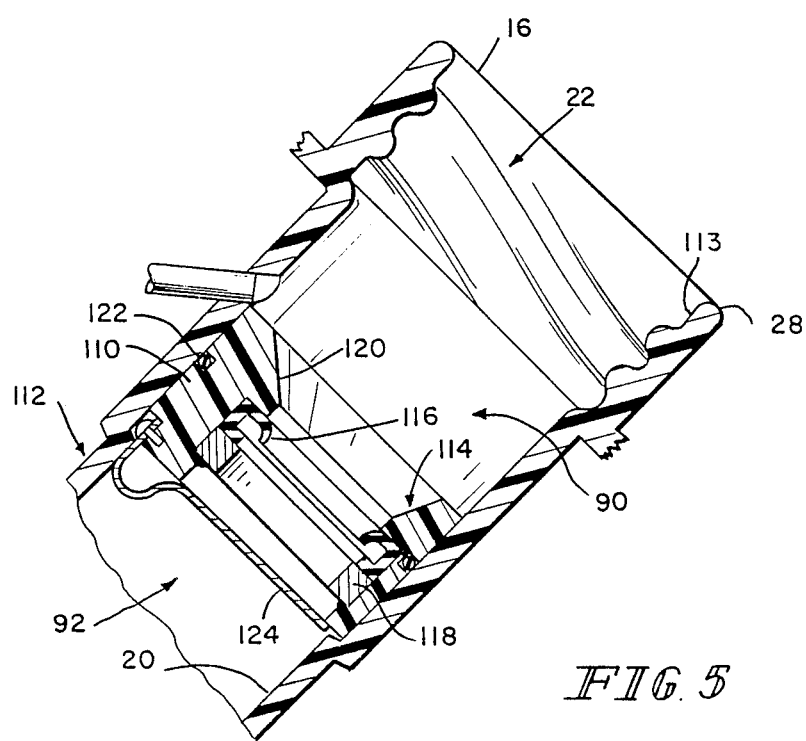
FIG. 5 is a longitudinal sectional view of another embodiment of the present invention showing a replaceable partition sealing assembly in a mounted position within a filler neck.

In another embodiment of the invention illustrated in FIG. 5, those elements referenced by numbers identical to those in FIGS. 1–4 perform the same or similar function. Referring to FIG. 5, a partition 110 is staked in place in the filler neck 112 in proximity to the filler neck mouth 113 to separate filler neck 112 into an outer chamber 90 and an inner chamber 92. The outer chamber 90 is communicable with the atmosphere via filler neck mouth 113 whenever the fuel cap (not shown) is removed. The inner chamber 92 is always in fluid communication with the fuel tank (not shown) via the filler neck 112. Advantageously, partition 110 provides a vapor-tight inner chamber 92 so as to prevent escape of untreated fuel vapors to the atmosphere during refueling.

At service, partition 110 may be easily detached for repair or disposal. As shown in FIG. 5, the inner diameter of outer chamber 90 is stepped to permit removal of the partition 110 therethrough. One advantage of the present invention is that partition 110 is replaceable as a unit for service through the outer chamber 92 and filler neck mouth 113 without disassembly of a vapor recovery module (not shown) from its installed position in a vehicle. After service, a repaired or replacement partition may be staked into a proper position within filler neck 112.

Partition 110 includes a nozzle size-restricting passageway 114 for admitting a pump nozzle (not shown in FIG. 5) into the inner chamber 92. An annular nozzle seal 116 sealingly embraces the pump nozzle during pumping. Annular nozzle seal 116 is held in sealing position in the passageway 114 by retainer 118 so that fuel can be dispensed into the inner chamber 92 without coupling the inner and outer chambers 90, 92 in fluid communication during refueling. Hard nozzle pilot surface 120 is provided in passageway 114 to protect seal 116 from damage during refueling. An 0-ring seal 122 is situated in a recess formed in an exterior wall of partition 110 to engage an interior wall of passageway 114 in sealing relation. Leaded fuel splash door 124 is pivotally mounted or otherwise deflectable in relation to an inner end of partition 110 in a customary way to splash leaded fuel dispensed using an ordinary pump nozzle back toward a user.

Another embodiment of the invention is illustrated in FIGS. 6–12. In this embodiment, an elastic annular seal member 210 is mounted in a necked-down portion 212 of a filler neck 214 using a seal retainer 216 that is connected to the filler neck. Seal member 210 is formed to include an aperture 218 through which a fuel-dispensing nozzle 220 is inserted during refueling. Advantageously, a first liquid fuel and fuel vapor seal is established during refueling as nozzle 220 engages seal member 210 as it enters filler neck 214 and then deflects seal member 210 in an axially inwardly extending direction shown by hollow arrow 222. In addition, a second liquid fuel and fuel vapor seal always exists between seal member 210 and the necked-down portion 212 of filler neck 214 because of the way in which seal retainer 216 clamps seal member 210 to necked-down portion 212. Of course, seal member 210 is made of an elastic material that is impervious to liquid fuel and fuel vapor.

Referring to FIGS. 8 and 9, it will be seen that seal member 210 includes a radially inner annular rim portion 224 which is formed to include the nozzle-receiving aperture 218 and a radially outer annular base portion 226 surrounding the annular rim portion 224. An annular web 228 extends around the circumference of annular rim portion 224 and interconnects the rim and base portions 224, 226. As seen best in FIGS. 6 and 9, the axially extending thickness 230 of web 228 is less than the axially extending thickness 232 of the axially extending, radially outwardly facing annular wall of rim portion 224 and the axially extending thickness 234 of the base portion 226.

Annular rim portion 224 includes a circular perimeter end wall 236 at its radially innermost edge which is configured to define nozzle-receiving aperture 218. The inner diameter of circular wall 236 is selected so that it will be slightly less than the outer diameter of a conventional fuel-dispensing nozzle 220. It will be appreciated that the elastic annular rim portion 224 will be deflected in an axially inward direction 222 as shown in FIG. 6 upon insertion of nozzle 220 into a slightly smaller nozzle-receiving aperture 218.

Annular rim portion 224 also includes an axially outwardly facing first sealing face 238 and an axially inwardly facing second sealing face 240. As seen best in FIG. 9, first and second sealing faces 238, 240 diverge in a radially outwardly extending direction from the circular wall 236 toward the base portion 226. The included angle between faces 238 and 240 is preferably about 35°. The first sealing face 238 will engage the exterior surface 242 of nozzle 220 as shown in FIG. 6 to establish a liquid fuel and fuel vapor seal extending about the circumference of the exterior surface 242 during introduction of nozzle 220 into filler neck 214. The first sealing face 238 contacts the entire circumference of exterior surface 242 when the nozzle 220 is in the filler neck 214 because annular rim portion 224 is deflected in axially inward direction 222 upon engagement with nozzle 220 and the elastic character of seal member 210 yieldably biases annular rim portion 224 in a radially inward direction. A substantially leak-proof seal is established between annular rim portion 224 and the exterior surface 242 of nozzle 220 even though the nozzle 220 may be deformed to an out-of-round configuration. First sealing face 238 will remain biased into sealing engagement with nozzle 220 as long as the nozzle 220 is left in the filler neck 214 during refueling.

This circumferentially extending liquid fuel and fuel vapor seal will not be broken during the first stages of withdrawal of the nozzle 220 from the filler neck 214. The second sealing face 240 engages the exterior surface 242 of nozzle 220 as shown in FIG. 7 to maintain the seal therebetween during withdrawal of nozzle 220 from filler neck 214. This seal is maintained until nozzle 220 is removed from the nozzle-receiving aperture 218 formed in elastic annular seal member 210.

As shown diagrammatically in FIG. 10, the elastic annular rim portion 224 is moved, in sequence, from a first position (solid line) wherein first sealing face 238 engages nozzle surface 242 to a second position (dotted line) wherein second sealing face 240 engages nozzle surface 242 as the nozzle 220 is withdrawn from nozzle-receiving aperture 218. It will be appreciated that annular rim portion 224 will be radially compressed between nozzle surface 242 and an inner wall 244 of the necked-down portion 212 of filler neck 214 as nozzle 220 is withdrawn because the undeflected annular rim portion (phantom line) has a radially extending dimension 246 that is generally greater than the radially extending distance 248 between nozzle surface 242 and fixed inner wall 244 of filler neck 214. Such radial compression helps to prevent liquid fuel and fuel vapor leaks past seal member 210 during withdrawal of nozzle 220 from filler neck 214.

Referring again to FIG. 9, it will be seen that seal member 210 is formed to include an axially outwardly facing first annular groove 250 and an axially inwardly facing second annular groove 252. First annular groove 250 is defined by an axially outwardly extending, radially outwardly facing first annular side wall 254 of rim portion 224, an axially outwardly extending, radially inwardly facing first annular side wall 258 of base portion 226, and an axially outwardly facing annular bottom wall 256 provided by the top side of annular web portion 228. Likewise, second annular groove 252 is defined by an axially inwardly extending, radially outwardly facing second annular side wall 260 of rim portion 224, an axially inwardly extending, radially inwardly facing second annular side wall 264 of base portion 226, and an axially inwardly facing annular bottom wall 262 provided by the underside of annular web portion 228.

Web portion 228 is appended to rim portion 224 to partition a radially outwardly facing surface of height 232 into the first and second annular side walls 254 and 260. It will be appreciated that rim portion 224 will be able to move easily relative to the fixed base portion 226 because the relatively thinner web portion 228 will be able to stretch, if necessary, to maintain rim portion 224 in sealing contact with nozzle surface 242 as nozzle 220 is moved in filler neck 214. In fact, in a preferred embodiment, web portion 228 is configured to stretch an amount sufficient to permit either or both of first and second annular side walls 254, 260 to disengage partly or completely from inner wall 244 of filler neck 214 or inner wall 266 of seal retainer 216 as rim portion 224 is moved relative to fixed base portion 226 by nozzle 220. Nevertheless, the liquid fuel and fuel vapor seal extant between nozzle 220 and filler neck 214 is not broken because of the circumferentially extending seal developed between necked-down portion 212 and seal member 210.

Seal retainer 216 is connected to the filler neck 214 as illustrated in FIGS. 6 and 7 to hold seal member 210 in sealing engagement with necked-down portion 212 of filler neck 214. Initially, seal member 210 is nested in a recessed region of the necked-down portion 212 so that an axially outwardly extending annular lip 268 of necked-down portion 212 is inserted into the second annular groove 252. Referring also to FIG. 10, annular lip 268 acts to hold seal member 210 in place so that an axially inwardly facing annular surface 270 of base portion 226 abuts an axially outwardly facing surface 272 of necked-down portion 212 and a radially outwardly facing annular surface 274 of base portion 226 abuts a radially inwardly facing annular surface 276 of necked-down portion 212. The axially outwardly facing surface 272 is circular in shape and interconnects annular lip 268 and annular surface 276 as shown best in FIG. 8.

Seal retainer 216 includes an axially inwardly extending annular lip 278 that is inserted into the first annular groove 250 formed in seal member 210 upon connection of seal retainer 216 to filler neck 214. Essentially, seal retainer 216 clamps elastic seal member 210 against necked-down portion 212 when connected to filler neck 214 to establish a circumferentially extending liquid fuel and fuel vapor seal therebetween.

In the illustrated embodiment, seal retainer 216 includes three circumferentially spaced-apart retaining arms 280 that are cantilevered to axially extending peripheral ribs 282 to lie intermediate an annular top wall 284 and annular bottom wall 286 of seal retainer 216. Necked-down portion 212 includes an axially outwardly extending, radially inwardly facing annular wall 288 defining a retainer-receiving aperture and an axially outwardly facing, radially inwardly extending annular retainer-supporting surface 290 interconnecting walls 276 and 288 as shown in FIG. 8. Three circumferentially spaced-apart mounting tabs 292 are cantilevered to annular wall 288 to lie in substantially spaced-apart parallel relation to the annular retainer-supporting surface 290 as shown in FIGS. 8, 11, and 12.

Seal retainer 216 is illustratively rotatably connected to filler neck 214 in the manner shown in FIGS. 11 and 12. Initially, seal retainer 216 is positioned over seal member 210 once seal member 210 is deposited into its recessed position in necked-down portion 212. Seal retainer 216 is then inserted into the retainer-receiving aperture adjacent inwardly facing annular wall 288 in necked-down portion 212 so that its annular bottom wall 286 engages the annular retainer-supporting surface 290 as shown in FIG. 12. At this point, retaining arms 280 are positioned to lie adjacent to mounting tabs 292 in an unlocked position as shown in FIG. 12. Next, the seal retainer 216 is rotated relative to filler neck 214 in a clockwise direction 294 shown in FIG. 12 so that the resilient retainer arms 280 override mounting tabs 292 causing each mounting tab 292 to be locked between another axially extending peripheral rib 296 and a finger 298 at the distal end of retaining arm 280 as shown in FIG. 11. Alternatively, it will be understood that seal retainer 216 could be connected to filler neck 214 in a variety of different ways to cause seal retainer 216 to clamp seal member 210 in sealed engagement to necked-down portion 212.

Necked-down portion 212 also includes an axially inwardly extending annular seal ring 310 and a seal retainer ring 312 as shown in FIGS. 6 and 7. Seal ring 310 is fixed to necked-down portion 212 to engage spring-loaded, pivoting flap door 314 coupled to filler neck 214 in sealing relation upon removal of nozzle 220 from the filler neck.

Although the invention has been described in detail with reference to certain preferred embodiments, variations and modifications exist within the scope and spirit of the invention as described and defined in the following claims.

What is claimed is:

1. A filler neck seal assembly adapted to seal a fuel nozzle in a fuel filler neck comprising
   an elastic seal member having an annular fuel nozzle-sealing portion and an annular filler neck-mounting portion surrounding the annular fuel nozzle-sealing portion in radially outwardly spaced relation,
   a seal retainer including means adapted for engaging a filler neck containing the elastic seal member and means adapted for unyieldingly clamping the annular filler neck mounting portion of the elastic seal member to the filler neck to establish a fixed circumferentially extending liquid fuel and fuel vapor seal between the elastic seal member and the filler neck and adapted to also cantilever the annular fuel nozzle-sealing portion for movement relative to the clamped filler neck-mounting portion in response to engagement with a fuel nozzle during movement of the fuel nozzle in the filler neck, and
   wherein the annular fuel nozzle-sealing portion includes an annular, radially inwardly facing, perimeter end wall defining a nozzle-receiving aperture, and inclined annular outer sealing face adapted to face in an axially outwardly direction toward a mouth of the filler neck to engage the nozzle in sealing relation during insertion of the nozzle into the nozzle-receiving aperture, and an inclined annular inner sealing face adapted to face in an axially inwardly facing direction away from the filler neck mouth to engage the nozzle in sealing relation during withdrawal of the nozzle from the nozzle-receiving aperture, and the outer and inner sealing faces are interconnected by the annular, radially inwardly facing, perimeter end wall and diverge in a radially outwardly extending direction away from the perimeter end wall and toward the filler neck-mounting portion.

2. The assembly of claim 1 wherein the retainer clamps the elastic seal member through a bayonet-type joint.

3. A filler neck seal assembly adapted to seal a fuel nozzle in a fuel filler neck comprising
   an elastic seal member having an annular fuel nozzle-sealing portion and an annular filler neck-mounting portion surrounding the annular fuel nozzle-sealing portion in radially outwardly spaced relation,
   a seal retainer including means adapted for engaging a filler neck containing the elastic seal member and means adapted for unyieldingly clamping the annular filler neck mounting portion of the elastic seal member to the filler neck to establish a fixed circumferentially extending liquid fuel and fuel vapor seal between the elastic seal member and the filler neck and adapted to also cantilever the annular fuel nozzle-sealing portion for movement relative to the clamped filler neck-mounting portion in response to engagement with a fuel nozzle during movement of the fuel nozzle in the filler neck, and
   wherein the elastic seal member is formed to include an axially outwardly facing first annular groove between the fuel nozzle-sealing and filler neck-mounting portions, a radially extending, axially outwardly facing surface defining a bottom wall of the first annular groove, an axially inwardly facing second annular groove between the fuel nozzle-sealing and filler neck-mounting portions, and a radially extending, axially inwardly facing surface defining a bottom wall of the second annular groove.

4. The assembly of claim 3, wherein positioning means extend into the second annular groove formed in the seal member and is adapted for positioning the filler neck-mounting portion in sealing engagement with the filler neck, and the seal retainer includes retaining means extending into the first annular groove formed in the seal member and adapted for retaining the filler neck-mounting portion in a sealing engagement with the filler neck to establish a fixed circumferentially extending liquid fuel and fuel vapor seal between the seal member and the filler neck.

5. The assembly of claim 4 wherein the seal retainer includes means for rotatably engaging the filler neck to place the retaining in the first annular groove formed in the seal member.

6. The assembly of claim 1, wherein the retainer clamps the elastic seal member through a bayonet-type joint.

7. An assembly adapted for use in a filler neck having a mouth and an inner wall defining a nozzle-receiving passageway communicating with the filler neck mouth, the assembly comprising an elastic annular seal member including a radially outer annular base portion, a radially inner annular rim portion formed to include a nozzle-receiving aperture, and an annular web interconnecting the annular base and rim portions, a seal retainer adapted to be connected to the filler neck to clamp the annular base portion against the inner wall of the filler neck to establish a fixed circumferentially extending liquid fuel and fuel vapor seal therebetween, the annular rim portion being movable relative to the clamped annular base portion and thus adapted to be moveable relative to the inner wall of the filler neck in response to engagement of the annular rim portion and the nozzle during insertion of the nozzle into and withdrawal of the nozzle from the nozzle-receiving aperture formed in the annular rim portion so that unbroken sealing engagement of the annular rim portion and the nozzle is maintained when the nozzle is moving through and stationary in the nozzle-receiving aperture to establish a circumferentially extending liquid fuel and fuel vapor between the annular rim portion and the nozzle, and wherein the annular rim portion includes an annular, radially inwardly facing, perimeter end wall defining the nozzle-receiving aperture, an inclined annular outer sealing face presented in an axially outwardly direction and adapted to face toward the filler neck mouth to engage the nozzle in sealing relation during insertion of the nozzle into the nozzle-receiving aperture, and an inclined annular inner sealing face presented in an axially inwardly facing direction and adapted to face away from the filler neck mouth to engage the nozzle in sealing relation during withdrawal of the nozzle from the nozzle-receiving aperture, wherein the outer and inner sealing faces are interconnected by the annular, radially inwardly facing, perimeter end wall and diverge in a radially outwardly extending direction away from the perimeter end wall and toward the base portion.

8. The assembly of claim 7, wherein the annular rim portion is elastically stretched and deflected in an axially inwardly extending direction that is adapted to face away from the filler neck mouth upon engagement with the nozzle during insertion of the nozzle into the nozzle-receiving aperture formed in the annular rim portion so as to be adapted to maintain the inclined outer sealing face of the annular rim portion in sealing engagement with the nozzle.

9. The assembly of claim 7, wherein the annular rim portion is elastically stretched and deflected in an axially outwardly extending direction that is adapted to face toward the filler neck mouth upon engagement with the nozzle during withdrawal of the nozzle from the nozzle-receiving aperture formed in the annular rim portion so as to be adapted to maintain the inclined inner sealing face of the annular rim portion in sealing engagement with the nozzle.

10. The assembly of claim 7, wherein the retainer clamps the elastic seal member through a bayonet-type joint.

11. An assembly adapted for use in a filler neck having a mouth and an inner wall defining a nozzle-receiving passageway communicating with the filler neck mouth, the assembly comprising an elastic annular seal member including a radially outer annular base portion, a radially inner annular rim portion formed to include a nozzle-receiving aperture, and an annular web interconnecting the annular base and rim portions, a seal retainer adapted to be connected to the filler neck to clamp the annular base portion against the inner wall of the filler neck to establish a fixed circumferentially extending liquid fuel and fuel vapor seal therebetween, the annular rim portion being movable relative to the clamped annular base portion and thus adapted to be moveable relative to the inner wall of the filler neck in response to engagement of the annular rim portion and the nozzle during insertion of the nozzle into and withdrawal of the nozzle from the nozzle-receiving aperture formed in the annular rim portion so that unbroken sealing engagement of the annular rim portion and the nozzle is maintained when the nozzle is moving through and stationary in the nozzle-receiving aperture to establish a circumferentially extending liquid fuel and fuel vapor between the annular rim portion and the nozzle, wherein the seal member is formed to include a first axially outwardly facing annular groove between the annular rim and base portions, the web includes a radially extending, axially outwardly facing surface defining a bottom wall of the first annular groove, the seal member is further formed to include a second axially inwardly facing annular groove between the annular rim and base portions, and the web further includes a radially extending, axially inwardly facing surface defining a bottom wall of the second annular groove.

12. The assembly of claim 11, wherein positioning means extend into the second annular groove formed in the seal member so as to be adapted for positioning the annular base portion in sealing engagement with the inner wall of the filler neck, and wherein the seal retainer includes retaining means extending into the first annular groove formed in the seal member so as to be adapted to retain the annular base portion in sealing engagement with the inner wall of the filler neck to establish the fixed circumferentially extending liquid fuel and fuel vapor seal between the seal member and the filler neck.

13. The assembly of claim 12, wherein the seal retainer includes means adapted for rotatably engaging the filler neck to place the retaining means in the first annular groove formed in the seal member.

14. The assembly of claim 11, wherein the retainer clamps the elastic seal member through a bayonet-type joint.

15. An assembly adapted for use in a filler neck having a mouth and an inner wall defining a nozzle-receiving passageway communicating with the filler neck mouth, the assembly comprising an elastic annular seal member including a radially outer annular base portion, a radially inner annular rim portion formed to include a nozzle-receiving aperture, and an annular web interconnecting the annular base and rim portions, a seal retainer adapted to be connected to the filler neck to clamp the annular base portion against the inner wall of the filler neck to establish a fixed circumferentially extending liquid fuel and fuel vapor seal therebetween, the annular rim portion being movable relative to the clamped annular base portion and thus adapted to be moveable relative to the inner wall of the filler neck in response to engagement of the annular rim portion and the nozzle during insertion of the nozzle into and withdrawal of the nozzle from the nozzle-receiving aperture formed in the annular rim portion so that unbroken sealing engagement of the annular rim portion and the nozzle is maintained when the nozzle is moving through and stationary in the nozzle-receiving aperture to establish a circumferentially extending liquid fuel and fuel vapor between the annular rim portion and the nozzle, wherein the annular base portion includes a circumferentially extending inner perimeter end wall, the annular rim portion includes a circumferentially extending outer perimeter end wall connected to the inner perimeter end wall by the annular web, and wherein the web includes an axially outwardly facing annular wall adapted to face toward the filler neck mouth and an axially inwardly facing annular wall adapted to face away from the filler neck mouth and lying in substantially spaced-apart parallel relation to the axially outwardly facing annular wall to define a uniform axially extending thickness of the web, the web is appended to the annular rim portion to partition the circumferentially extending outer perimeter end wall of the annular rim portion to define an axially outwardly extending, radially outwardly facing first annular side wall having an annular bottom edge appended to the axially outwardly facing annular wall of the web and an annular top edge in spaced-apart relation to the annular bottom edge and an axially inwardly extending, radially outwardly facing second annular side wall having an annular top edge appended to the axially inwardly facing annular wall of the web and an annular bottom edge in spaced-apart relation to the annular top edge so that the uniform axially extending thickness of the web is less than the axially extending distance between the annular top edge of the first annular side wall and the annular bottom edge of the second annular side wall.

16. The assembly of claim 15, wherein the annular rim portion further includes an annular, radially inwardly facing perimeter end wall defining the nozzle-receiving aperture, an inclined annular outer sealing face interconnecting the annular, radially inwardly facing perimeter end wall and the annular top edge of the first annular side wall so as to be adapted to engage the nozzle in sealing relation during insertion of the nozzle into the nozzle-receiving aperture, and an inclined annular inner sealing face interconnecting the annular, radially inwardly facing perimeter end wall and the annular bottom edge of the second annular side wall so as to be adapted to engage the nozzle in sealing relation during withdrawal of the nozzle from the nozzle-receiving aperture, and wherein the outer and inner sealing faces diverge in a radially outwardly extending direction from the annular, radially inwardly facing perimeter end wall toward the annular base portion.

17. The assembly of claim 15, wherein the retainer clamps the elastic seal member through a bayonet-type joint.

18. A system for communicating fuel from a fuel-dispensing nozzle to a fuel tank, the system comprising
a filler neck having a mouth and an inner wall defining a nozzle-receiving passageway connected to the mouth, and
means for dividing the nozzle-receiving passageway into an outer chamber communicable with the atmosphere through the mouth and an inner chamber in fluid communication with the fuel tank, the dividing means including means in the nozzle-receiving passageway for establishing a fixed circumferentially extending liquid fuel and fuel vapor seal to block flow of liquid fuel and fuel vapor through any space between the inner wall of the filler neck and a fuel-dispensing nozzle inserted into the inner chamber through the filler neck mouth so that the fuel-dispensing nozzle is admitted into the inner chamber without coupling the inner and outer chambers in fluid communication, the establishing means including an elastic annular seal member including an annular radially outer base portion having a perimeter wall sealingly engaging the inner wall of the filler neck, an annular radially inner rim portion having a radially inner perimeter edge defining a nozzle-receiving aperture, and a radially extending annular web portion interconnecting the rim and base portions to cantilever the rim portion in the nozzle-receiving passageway, the rim portion having an annular inclined outer sealing face presented in an axially outwardly facing direction toward the filler neck mouth to engage the fuel-dispensing nozzle during insertion of the nozzle into the nozzle-receiving aperture and an annular inclined inner sealing face presented in an axially inwardly facing direction away from the filler neck mouth to engage the fuel-dispensing nozzle during withdrawal of the nozzle from the nozzle-receiving aperture, the inclined outer and inner sealing faces being interconnected by the radially inner perimeter edge of the rim portion and diverging in a radially outwardly extending direction from the radially inner perimeter edge toward the radially outer base portion, the rim portion being movable relative to the base portion during axial movement of the nozzle in the nozzle-receiving aperture so that the rim portion is deflected in an axially inwardly extending direction away from the filler neck mouth to maintain the inclined outer sealing face of the rim portion in sealing engagement with the nozzle during insertion of the nozzle into the nozzle-receiving aperture and in an axially outwardly extending direction toward the filler neck mouth to maintain the inclined inner sealing face of the rim portion in sealing engagement with the nozzle during withdrawal of the nozzle from the nozzle-receiving aperture.

19. The system of claim 18, wherein the annular rim portion has a radially extending triangular cross-sectional shape defined by triangle legs provided by the interconnected diverging inclined outer and inner sealing faces in cooperation with a triangle base provided by an annular, axially extending, radially outwardly facing wall of the annular rim portion arranged to interconnect ends of the inclined outer and inner sealing faces.

20. The system of claim 19, wherein the radially extending annular web portion is appended to the annular, axially extending, radially outwardly facing wall of the annular rim portion, the annular web portion has a maximum axially extending thickness that is less than the axially extending width of the annular, axially extending, radially outwardly facing wall.

21. The assembly of claim 18, wherein the annular seal member is formed to include a first axially outwardly facing annular groove between the annular rim and base portions, the annular web portion includes a radially extending, axially outwardly facing surface defining a bottom wall of the first annular groove, the annular seal member is further formed to include a second axially inwardly facing annular groove between the annular rim and base portions, and the annular web portion further includes a radially extending, axially inwardly facing surface defining a bottom wall of the second annular groove.

22. The assembly of claim 18, wherein the filler neck includes positioning means extending into the second annular groove formed in the annular seal member for positioning the annular base portion in sealing engagement with the inner wall of the filler neck, and further comprising a seal retainer connected to the filler neck, the seal retainer including retaining means extending into the first annular groove formed in the annular seal member for retaining the annular base portion in sealing engagement with the inner wall of the filler neck to establish the fixed circumferentially extending liquid fuel and fuel vapor seal between the annular seal member and the filler neck.

23. The assembly of claim 22, wherein the seal retainer includes means for rotatably engaging the filler neck to place the retaining means in the first annular groove formed in the annular seal member.

24. A filler neck seal assembly adapted for sealing a fuel nozzle with a filler neck, comprising
an elastic seal member having an annular fuel nozzle-sealing portion comprising a two-sided flap and an annular filler neck-mounting portion having a peripheral edge surrounding the annular fuel nozzle-sealing portion in radially outwardly spaced relation,
a seal retainer including means adapted for engaging a filler neck containing the elastic seal member and for unyieldingly clamping the peripheral edge of the annular filler-neck mounting portion of the elastic seal member to abut the filler neck to establish a fixed circumferentially extending liquid fuel and fuel vapor seal between the elastic seal member and the filler neck, wherein said clamping cantilevers the annular fuel nozzle-sealing two-sided flap portion for back and forth wiping movement in response to engagement with a fuel nozzle so that during movement of the fuel nozzle inward of the filler neck one side of the flap seals against the nozzle and during movement of the fuel nozzle outward of the filler neck the other side of the flap seals against the fuel nozzle.

25. The nozzle assembly of claim 25, wherein the sides of the flap are angled with respect to each other so as to form a tapered flap in cross section.

26. The assembly of claim 25, wherein the elastic annular seal member is formed to include an axially outwardly facing first annular groove between the fuel nozzle-sealing and filler neck-mounting portions and an axially inwardly facing second annular groove between the fuel nozzle-sealing and filler neck-mounting portions to assist in the clamping actions.

27. The assembly of claim 26, wherein positioning means extend into the second annular groove formed in the seal member and is adapted for positioning the filler neck-mounting portion in sealing engagement with the filler neck, and wherein the seal retainer includes retaining means extending into the first annular groove formed in the seal member and adapted for retaining the filler neck-mounting portion in sealing engagement with the filler neck to establish a fixed circumferentially extending liquid fuel and fuel vapor seal between the seal member and the filler neck.

28. The assembly of claim 24, wherein the retainer clamps the elastic seal member through a bayonet-type joint.

29. An assembly adapted for use in a filler neck having a mouth and an inner wall defining a nozzle-receiving passageway communicating with the filler neck mouth, the assembly comprising
an elastic annular seal member including a radially outer annular base portion having a peripheral outermost end, a radially inner annular rim portion comprising a two-sided flap formed to include a nozzle-receiving aperture, and an annular web interconnecting the annular base and rim portions,
a seal retainer connected to the filler neck and adapted to clamp the peripheral outermost end of the annular base portion against the inner wall of the filler neck to establish a fixed circumferentially extending liquid fuel and fuel vapor seal therebetween,
the annular rim portion being movable relative to the clamped annular base portion and adapted to have one side of the flap wipe the nozzle during insertion of the nozzle into the nozzle-receiving aperture and the other side of the flap wipe the nozzle during withdrawal from the nozzle-receiving aperture so that an unbroken sealing engagement of the annular rim portion and the nozzle is maintained when the nozzle is moving through and stationary in the nozzle-receiving aperture so as to establish a circumferentially extending liquid fuel and fuel vapor between the annular rim portion and the nozzle.

30. The nozzle assembly of claim 29, wherein the sides of the flap are angled with respect to each other so as to form a tapered flap in cross section.

31. The assembly of claim 30 wherein the two-sided flap is adapted to be elastically stretched and deflected in an axially inwardly extending direction upon engagement with the nozzle during insertion of the nozzle into the nozzle-receiving aperture to maintain the flap in sealing engagement with the nozzle.

32. The assembly of claim 30, wherein the two-sided flap is elastically stretched and deflected in an axially outwardly extending direction upon engagement with the nozzle during withdrawal of the nozzle from the nozzle-receiving aperture to maintain the flap in sealing engagement with the nozzle.

33. The assembly of claim 29, wherein the seal member is formed to include a first and second axially outwardly facing annular groove between the annular rim and base portions to assist in the clamping.

34. The assembly of claim 33, wherein a positioning means extends into the second annular groove formed in the seal member and is adapted for positioning the annular base portion in sealing engagement with the inner wall of the filler neck and wherein the seal retainer includes retaining means extending into the first annular groove formed in the seal member so as to be adapted to retain the annular base portion in sealing engagement with the inner wall of the filler neck and thus establish the fixed circumferentially extending liquid fuel and fuel vapor seal between the seal member and the filler neck.

35. The assembly of claim 29, wherein the retainer means clamps the elastic seal member through a bayonet-type joint.

* * * * *

UNITED STATES PATENT AND TRADEMARK OFFICE
CERTIFICATE OF CORRECTION

PATENT NO. :  4,977,936

DATED     :  December 18, 1990

INVENTOR(S) :  Robert H. Thompson et al.

It is certified that error appears in the above-identified patent and that said Letters Patent is hereby corrected as shown below:

In column 1, line 7, replace "07/198,384" with --07/148,384--.

In column 1, line 12, replace "896,081" with --846,081--.

In column 13, line 7, replace "claim 1" with --claim 3--.

Signed and Sealed this

Twenty-eighth Day of July, 1992

*Attest:*

DOUGLAS B. COMER

*Attesting Officer*   Acting Commissioner of Patents and Trademarks